United States Patent
Bando (10) Patent No.: US 6,236,577 B1
(45) Date of Patent: May 22, 2001

(54) POWER CIRCUIT WITH STABLE MAIN AND AUXILIARY POWER OUTPUTS

(75) Inventor: Kozo Bando, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/604,538

(22) Filed: Jun. 27, 2000

(30) Foreign Application Priority Data

Jul. 2, 1999 (JP) ................................................. 11-188731

(51) Int. Cl.[7] .................................................. H02M 3/335
(52) U.S. Cl. ................................ 363/19; 363/21; 363/70; 363/97
(58) Field of Search ................................. 363/19, 21, 65, 363/69, 70, 95, 97

(56) References Cited

U.S. PATENT DOCUMENTS

| | | | |
|---|---|---|---|
| 4,672,516 | * 6/1987 | Ney et al. | 363/21 |
| 5,019,717 | * 5/1991 | McCurry et al. | 363/65 |
| 5,126,930 | * 6/1992 | Ahn | 363/21 |
| 5,285,368 | * 2/1994 | Ishikawa | 363/65 |
| 5,534,768 | * 7/1996 | Chavannes et al. | 363/70 |
| 5,673,187 | * 9/1997 | Tokunaga et al. | 363/65 |
| 6,151,224 | * 11/2000 | Lim et al. | 363/70 |

FOREIGN PATENT DOCUMENTS 2563347    11/1997    (JP) ................................ H02M/3/28

* cited by examiner

Primary Examiner—Jeffrey Sterrett
(74) Attorney, Agent, or Firm—Ratner & Prestia (57) ABSTRACT

A power circuit for use in a TV receiver having a satellite broadcast receiving function or a teletext receiving function is disclosed. The power circuit comprises a main power source for supplying a large power to the main load, i.e., the signal-reception, signal-processing, and display circuits of the TV receiver, and a sub-power source for supplying power to small-power drawing circuits such as a satellite broadcast receiving tuner, a UHF/VHF tuner, a teletext receiving circuit, a microprocessor, and a remote control receiving circuit. In order to activate the main load while power is being supplied from the sub-power source to the sub-load, a switch circuit is turned ON and, thereby, the main power source is supplied to the main load. A circuit is provided for restricting current flowing into an output-voltage-detection and error-amplifier circuit connected with the sub-power source, thereby raising the output voltage from the sub-power source to the sub-load, immediately before the microprocessor renders the switch circuit conductive. Thus, the voltage drop occurring in the sub-power source when power is started to be supplied to the main load is avoided.

6 Claims, 6 Drawing Sheets

POWER CIRCUIT WITH STABLE MAIN AND AUXILIARY POWER OUTPUTS

FIELD OF THE INVENTION

The present invention relates to a power circuit for use in a television (TV) receiver.

BACKGROUND OF THE INVENTION

A power circuit for use in a TV receiver having a satellite broadcast receiving function or a teletext receiving function frequently comprises:
- a main power source for supplying a large power to the main load, i.e., the signal-reception, signal-processing, and display circuits of the TV receiver (hereinafter, called the TV circuit); and
- a sub-power source supplying power to small-power drawing circuits such as a satellite broadcast receiving tuner, a UHF/VHF (U/V) tuner, a teletext receiving circuit, a microprocessor, and a remote control receiving circuit.

Figure 5:
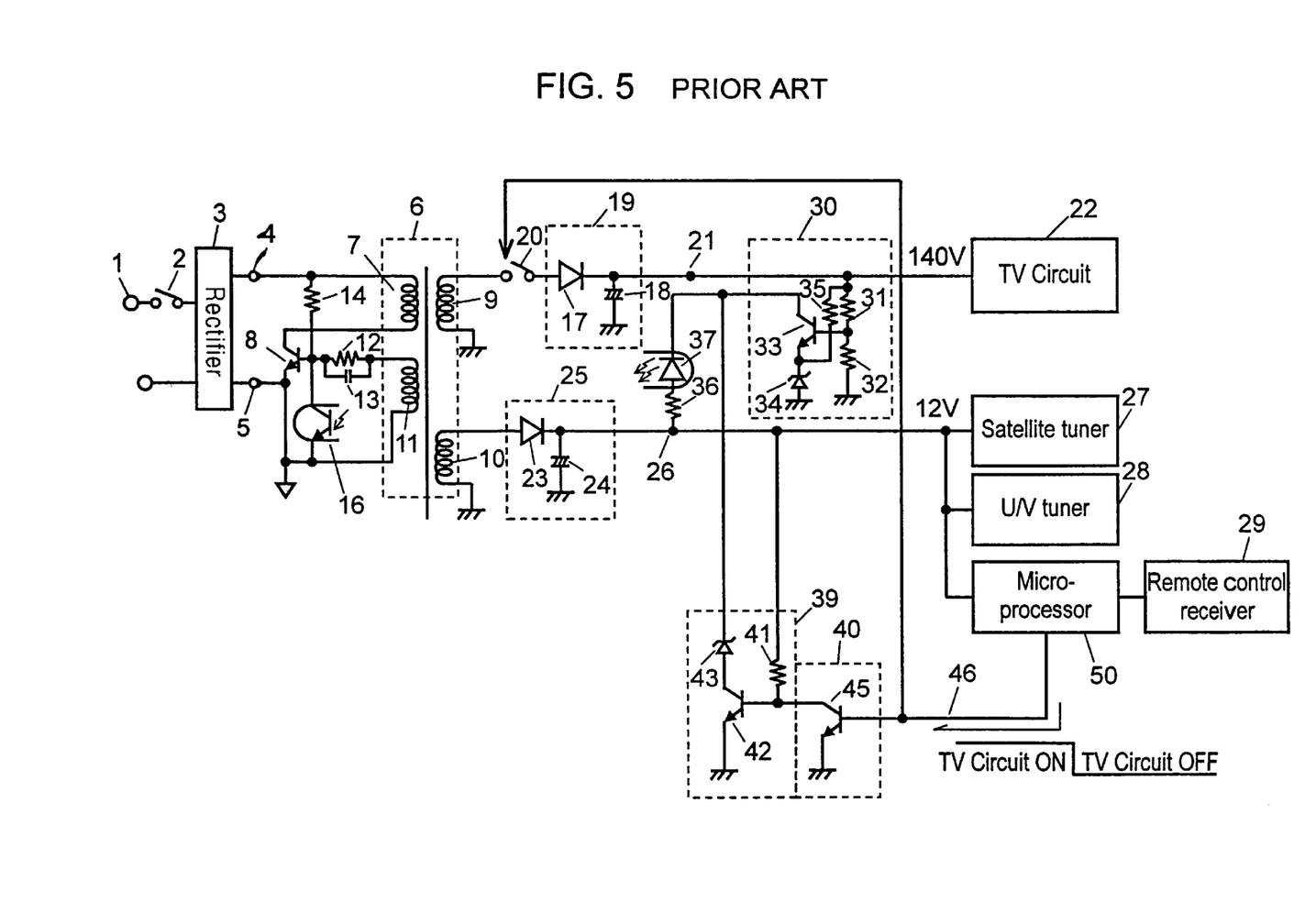
FIG. 5 is a block diagram of a power circuit used in a conventional television receiver.

FIG. 5 shows a circuit of the switching power source of a TV receiver having such a sub-power source as described above. In FIG. 5, AC source terminal 1 is connected to rectifier circuit 3 for converting AC to DC power source through power switch 2. A pair of DC output terminals 4 and 5 of rectifier circuit 3 have transistor 8 as the switching element connected therebetween through primary winding 7 of transformer 6.

Transformer 6 has secondary winding 9, tertiary winding 10, and fourth winding 11 magnetically coupled with primary winding 7. Fourth winding 11, connected between the base and emitter of transistor 8 through a parallel circuit of resistor 12 and capacitor 13, is a drive winding allowing transistor 8 to turn ON/OFF in a self-excited manner by means of positive feedback. Starting resistor 14 is connected between DC terminal 4 of rectifier circuit 3 and the base of transistor 8. Phototransistor 16, connected between the base and emitter of transistor 8, is a constant-voltage control element. Phototransistor 16 serves as a bypass for allowing the base current of transistor 8 to pass therethrough so that constant-voltage control of the output voltage of transistor 8 is achieved.

Secondary winding 9 is connected with first rectifier-and-smoothing circuit 19 formed of first rectifier diode 17 and first smoothing capacitor 18. The input line to first smoothing diode 17 is connected with switch 20. Output line 21 of first rectifier-and-smoothing circuit 19 is connected to TV circuit 22 as the main load.

Tertiary winding 10 is connected to second rectifier-and-smoothing circuit 25 formed of second rectifier diode 23 and second smoothing capacitor 24. Output line 26 of second rectifier-and-smoothing circuit 25 is connected to satellite tuner 27, U/V tuner 28, microprocessor 50, and remote control receiving circuit 29 as the sub-load.

To detect the voltage on output line 26 for achieving constant-voltage control while power is being supplied only to the sub-load, second output line 26 is connected with second output-voltage-detection and error-amplifier circuit 39, which is formed of voltage detecting resistor 41, error amplifying transistor 42, and zener diode 43 as a second reference voltage source. Resistor 41 is connected between second output line 26 and the base of transistor 42.

Zener diode 43 is inserted between the collector of transistor 42 and the cathode of light emitting diode 37, with its anode connected to the collector of transistor 42 and its cathode connected to the cathode of light emitting diode 37.

The anode of light emitting diode 37 is connected to second output line 26 through a resistor 36. Light emitting diode 37 is in common use for first and second output-voltage-detection and error-amplifier circuits 30 and 39.

Switch circuit 40 is constituted of transistor 45. Transistor 45 has its collector connected to the base of second error amplifying transistor 42 and its emitter connected to the ground.

When power is supplied to TV circuit 22 as the main load, microprocessor 50 applies a high-level output of TV-circuit-ON/OFF-control signal 46 to the base of transistor 45 of switch circuit 40. Thereby, while switch 20 is turned ON, transistor 45 of output switch circuit 40 is turned ON and second error amplifying transistor 42 is turned OFF.

Upon turning ON of switch 20, the voltage on output line 21 from first-rectifier-and-smoothing circuit 19 rises. To detect the voltage on output line 21 and perform constant-voltage control, there is output-voltage-detection and error-amplifier circuit 30 connected between first output line 21 and the ground. Circuit 30 is made up of resistors 31 and 32 connected between output line 21 and the ground, error amplifying transistor 33, zener diode 34 as a reference voltage source, and a resistor 35.

The base of transistor 33 is connected to the voltage dividing point of resistors 31 and 32. Zener diode 34 is connected to the emitter of transistor 33. Resistor 35 is inserted between output line 21 and the cathode of zener diode 34. Accordingly, a collector current corresponding to the difference between the voltage on output line 21 and the reference voltage given by zener diode 34 is allowed to flow. At this time, second output-voltage-detection and error-amplifier circuit 39 is inoperative because error amplifying transistor 42 is OFF.

Light emitting diode 37, connected between output line 21 and the collector of transistor 33 through resistor 36, emits a light quantity corresponding to the flow of collector current of transistor 33 to provide an optical input to phototransistor 16 optically coupled with light emitting diode 37.

Operations of transistor 8 as the switching element and the energy transferring operation performed through transformer 6 will be described.

When power switch 2 is turned ON, a flow of base current is produced in transistor 8 through starting resistor 14 and hence transistor 8 is turned ON. Upon turning ON of transistor 8, a positive feedback voltage is produced in fourth winding 11 so that transistor 8 is held ON. Since primary winding 7 of transformer 6 has an inductance, the collector current of transistor 8 increases with time.

The largest value of the collector current of transistor 8 is determined by the base current and the current amplification factor. When the collector current reaches the value equivalent to the product of the base current and the current amplification factor, transistor 8 is turned into its unsaturated state so that the positive feedback voltage in fourth winding 11 decreases. As a result, transistor 8 is turned into its OFF state. First and second rectifier diodes 17 and 23 are held OFF while transistor 8 is ON, and held ON while transistor 8 is OFF.

Upon turning OFF of transistor 8, the energy stored in the inductance of transistor 6 causes a flyback voltage to be generated. When switch 20 is OFF so that power is supplied only to the sub-load, only second smoothing capacitor 24 is charged with the generated flyback voltage. When switch 20 is ON so that power is also supplied to the TV circuit as the main load, both first and second smoothing capacitors 18 and 24 are charged.

Figure 6:
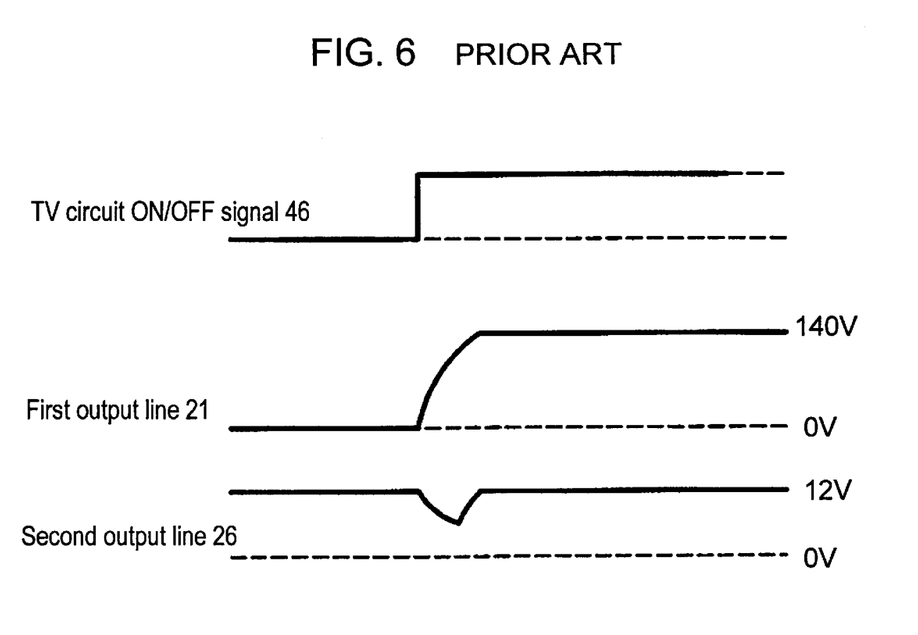
FIG. 6 is a timing chart of signals and voltages in the power circuit of the conventional television receiver.

When the main load, i.e., TV circuit 22, is started to operate, switch 20 and switch circuit 40 are turned ON with the sub-load, i.e., satellite tuner 27, U/V tuner 28, and the like, held operative. In this state, switch 20 and switch circuit 40 are turned ON by a signal from microprocessor 50. At this time, the main load drawing a much greater power than that drawn by the sub-load is suddenly put into connection with output line 21. Therefore, a phenomenon of voltage drop as shown in FIG. 6 occurs on output line 26.

SUMMARY OF THE INVENTION

It is an object of the present invention to avoid occurrence of the phenomenon as described above and make the sub-source voltage stabler.

In order to achieve the object as described above, the power circuit of the present invention comprises:

- a transformer including a secondary winding and a tertiary winding, magnetically coupled with a primary winding, and a switching element;
- a switch circuit connected in series with one end of the secondary winding for supplying power to a TV circuit and a first rectifier-and-smoothing circuit connected in series with the other end of the switch circuit;
- a second rectifier-and-smoothing circuit connected with the tertiary winding for supplying power to a different circuit from the TV circuit;
- a first output-voltage-detection and error-amplifier circuit for obtaining signal corresponding to the difference between a detected value of a first output voltage obtained from the first rectifier-and-smoothing circuit and a first reference voltage;
- a second output-voltage-detection and error-amplifier circuit for obtaining a signal corresponding to the difference between a detected value of a second output voltage obtained from the second rectifier-and-smoothing circuit and a second reference voltage;
- a microprocessor for activating the switch circuit and selectively activating the first and the second output-voltage-detection and error-amplifier circuits;
- a control circuit including a light-emitting element, responding commonly to the output of the first or second output-voltage-detection and error-amplifier circuit, and a photo-receiving element optically coupled with the light-emitting element for controlling the switching element such that the first or second output voltage is controlled to be constant in accordance with the change in the resistance value of the photo-receiving element; and
- a circuit for temporarily raising the output voltage obtained from the second rectifier-and-smoothing circuit immediately before the switch circuit is turned ON.

DESCRIPTION OF THE PREFERRED EMBODIMENTS

Preferred embodiments of the invention will be described with reference to FIG. 1, FIG. 2, FIG. 3, and FIG. 4. Throughout FIG. 1, FIG. 2, FIG. 3, and FIG. 4, corresponding portions to those in the conventional circuit shown in FIG. 5 and FIG. 6 are denoted by corresponding reference numerals and hence detailed description thereof will be omitted.

(Embodiment 1)

Figure 1:
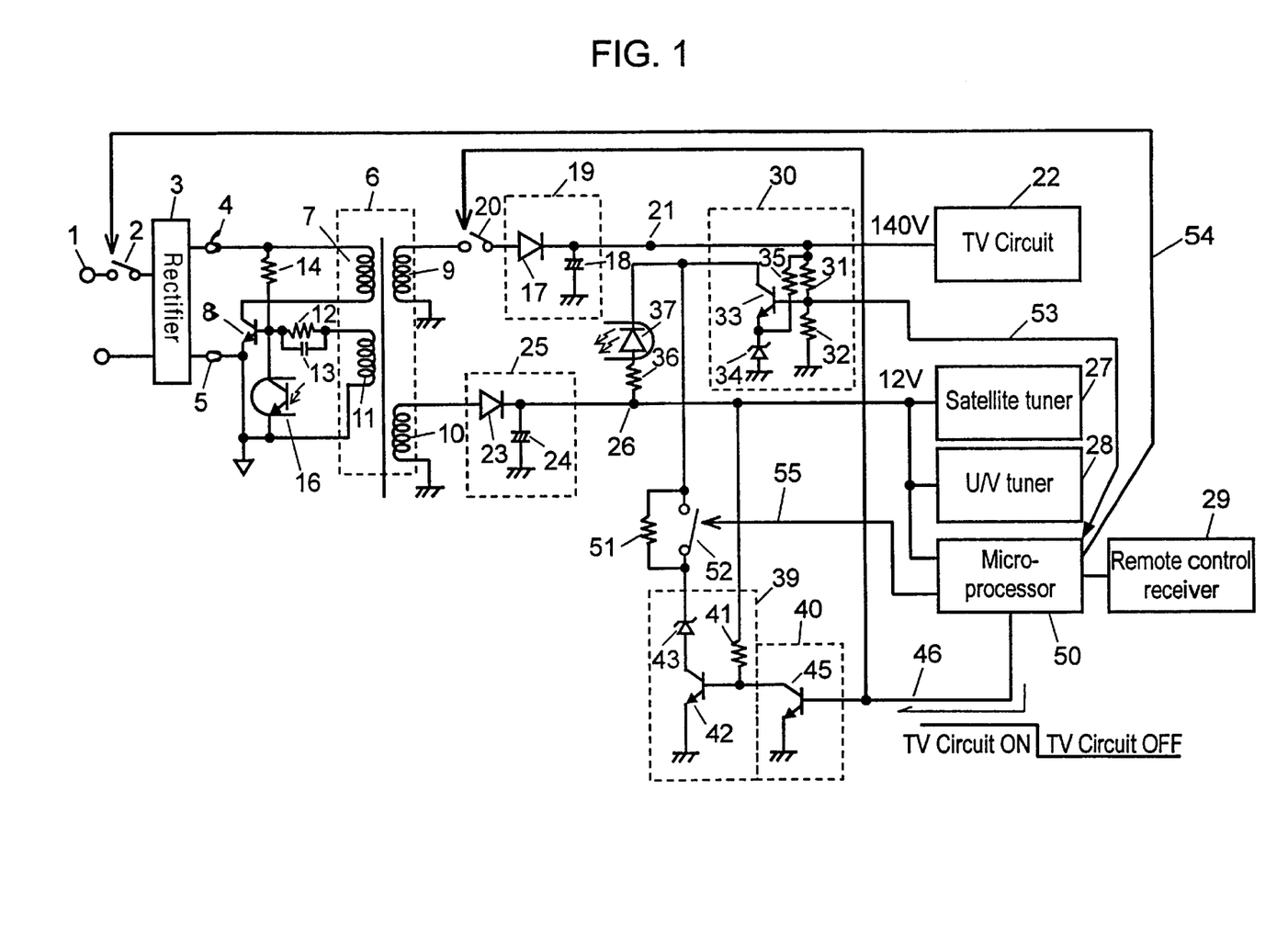
FIG. 1 is a block diagram of a power circuit for a television receiver according to a first embodiment of the invention.

FIG. 1 shows a structure according to an embodiment of the invention. Since those denoted by reference numeral 1–50 in FIG. 1 are like those shown in FIG. 5, description of the same will be omitted. The points in FIG. 1 different from FIG. 5 are:

- that resistor 51 is provided for limiting the current flowing into second output-voltage-detection and error-amplifier circuit 39 immediately before switch circuit 40 switches the operation in second output-voltage-detection and error-amplifier circuit 39 to the operation in first output-voltage-detection and error-amplifier circuit 30; and
- that switch 52 is provided for keeping resistor 51 shorted while second output-voltage-detection and error-amplifier circuit 39 is operative.

Thus, immediately before turning ON of switch circuit 40, the voltage on output line 26 is raised by the amount that compensates for the voltage drop occurring on output line 26 when switch circuit 40 is turned ON.

Figure 2:
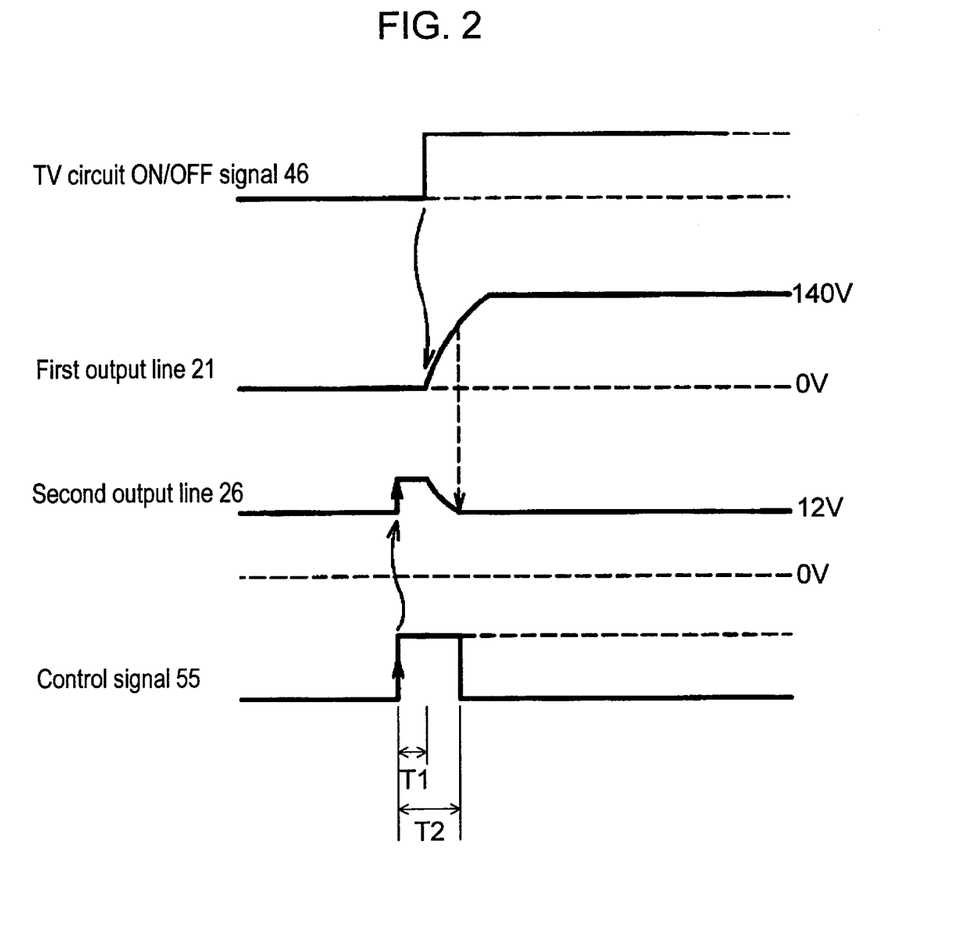
FIG. 2 is a timing chart of signals and voltages in the power circuit of the television receiver according to the first embodiment of the invention.

With reference to the timing chart of FIG. 2 and FIG. 1, operations will be described below.

When output line 26 is supplying power to the sub-load including satellite tuner 27, U/V tuner 28, microprocessor 50, and remote control signal receiving circuit 29, switch 52 is kept conductive to short resistor 51. Microprocessor 50 brings control signal 55 to a high level to turn OFF switch 52, in order that switch 52 is held opened for a predetermined period of time T2 from the point of time another predetermined period of time T1 prior to the timing of generation by microprocessor 50 of a high level output of TV-circuit-ON/OFF signal 46 for activating switch circuit 40. Accordingly, switch 52 is kept opened for the period of time T2 from the point of time immediately before switch circuit 40 is activated.

Therefore, with respect to second output-voltage-detection and erroramplifier circuit 39, resistor 51 is connected in series with zener diode 43, as the second reference voltage source, to limit the current flowing into light emitting diode 37. Accordingly, the amount of negative feedback on the base current of transistor 8 produced by phototransistor 16, optically coupled with light emitting diode 37, is decreased. As a result, the energy stored in first winding 7 of transformer 6 is increased. The energy stored in first winding 7 is dissipated from tertiary winding 10 so that the voltage on second output line 26 rises.

When the period of time T1 has elapsed after switch 52 was opened, transistor 45 of switch circuit 40 is turned ON and second error amplifying transistor 42 is turned OFF. At this instant, switch 20 is rendered conductive. Then, the voltage on output line 21 rises owing to the power supply from secondary winding 9 of transformer 6 through first rectifier-and-smoothing circuit 19. First output-voltage-detection and error-amplifier circuit 30 is activated and phototransistor 16 is controlled so that the voltage on first output line 21 is controlled to be constant. When the voltage on first output line 21 on the high load side has been controlled to be constant, the voltage on second output line 26 on the low load side also becomes virtually constant.

Since second error amplifying transistor 42 is turned OFF when the voltage on output line 21 has risen to reach a stable value, the voltage on second output line 26 is not subject to variation.

After microprocessor 50 supplied TV-circuit-ON/OFF-signal 46 to transistor 45 of switch circuit 40, signal 53 is detected by microprocessor 50 from the connecting point of resistors 31 and 32 of first output line 21. If the signal is not detected within a predetermined period of time, switch 2 is turned OFF from microprocessor 50. Upon turning OFF of the DC power source in this way, the power circuit is stopped. Therefore, stabilized operations of the TV receiver using the present power circuit can be realized.

According to the present embodiment as described above, no voltage drop occurs in the voltage on output line 26 when the first output line is started to operate. Hence, the sub-load circuit run from the sub-power source can further be stabilized.

(Embodiment 2)

Figure 3:
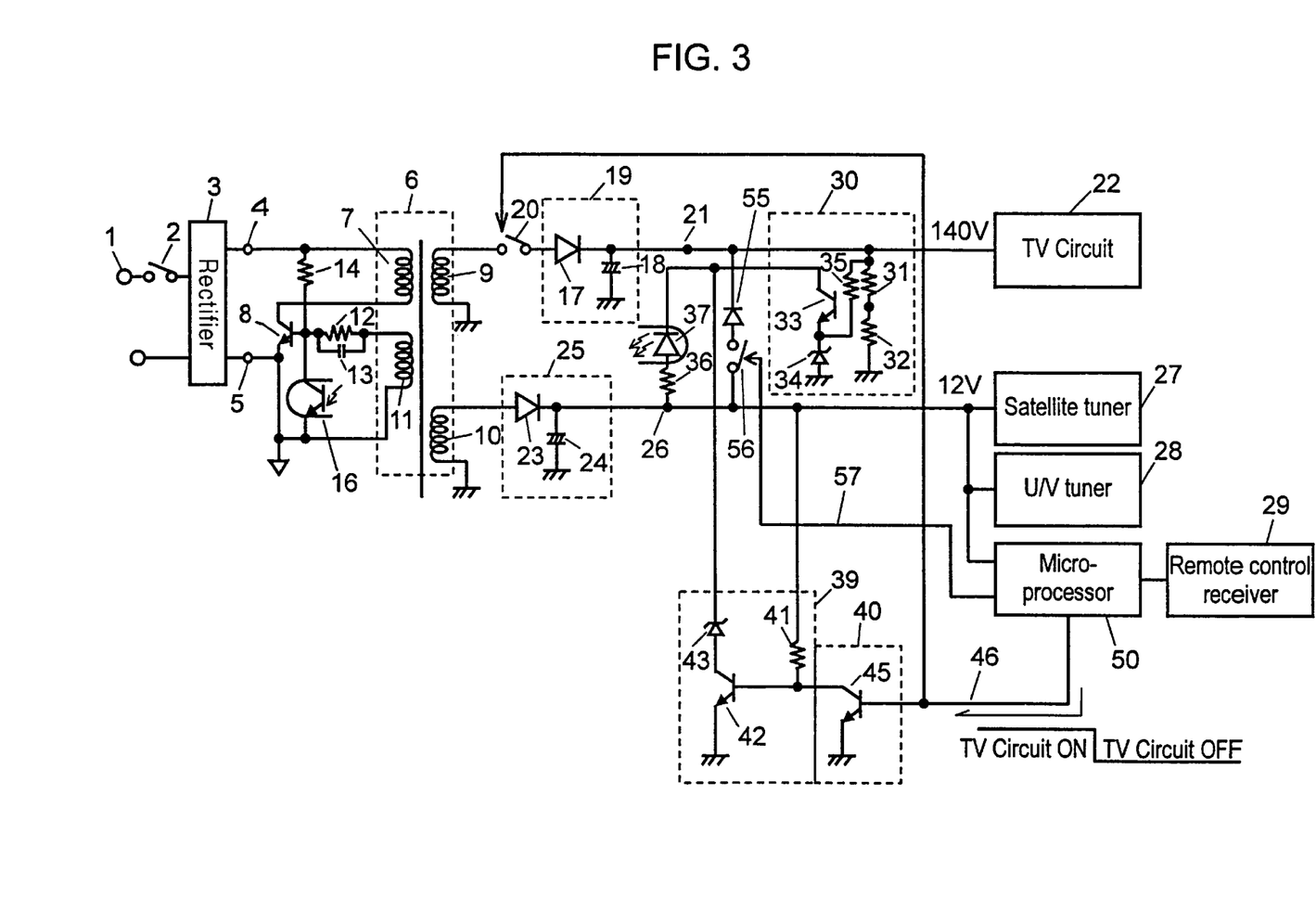
FIG. 3 is a block diagram of a power circuit for a television receiver according to a second embodiment of the invention.

Reference is made to FIG. 3 showing another embodiment. Since elements denoted by reference numeral 1–50 in FIG. 3 are like those in FIG. 5, description of the same will be omitted. Points in which FIG. 3 differs from FIG. 5 is that a circuit including reverse-current-preventing diode 55 is provided between second output line 26 and first output line 21, through switch 56, whereby the cathode of reverse-current-preventing diode 55 is connected to first output line 21 immediately before the operation in second output-voltagedetection and error-amplifier circuit 39 is switched, by switch circuit 40, to the operation in first output-voltage-detection and error-amplifier circuit 30. Thus, the power of output line 26 is supplied, in advance, to output line 21 in order to reduce the degree of voltage drop produced when switch 20 and switch circuit 40 are turned ON.

Figure 4:
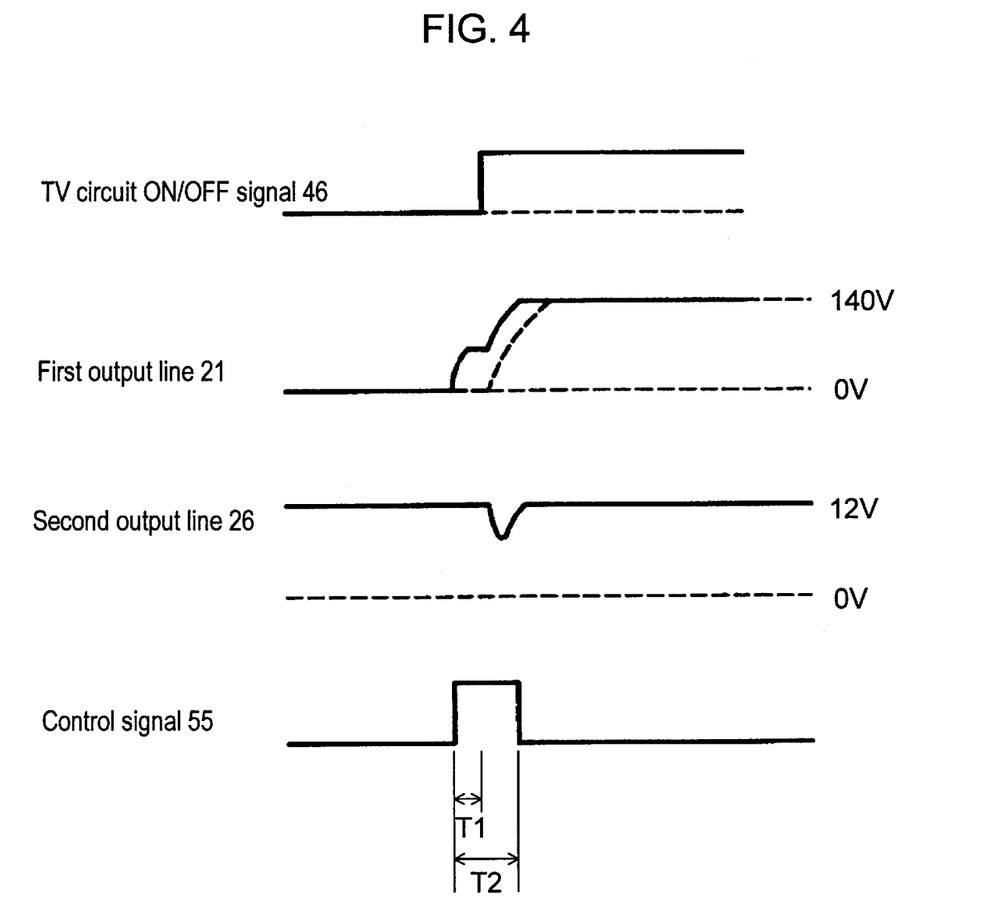
FIG. 4 is a timing chart of signals and voltages in the power circuit of the television receiver according to the second embodiment of the invention.

With reference to the timing chart of FIG. 4 and FIG. 3, operations will be described. Switch 56 is opened while output line 26 is supplying power to the sub-load including satellite tuner 27, U/V tuner 28, microprocessor 50, and remote control signal receiving circuit 29. Microprocessor 50 brings control signal 57 to a high level to turn ON switch 56, in order that switch 56 is closed for a predetermined period of time T2 from the point of time preceding, another predetermined period of time T1, the timing of generation of a high level output of TV-circuit-ON/OFF signal 46 by microprocessor 50 to activate switch circuit 40. Accordingly, switch 57 is kept closed for the period of time T2 from immediately before switch circuit 40 is activated.

Thereby, the power from output line 26 charges smoothing capacitor 18 of first rectifier-and-smoothing circuit 19, through switch 56 and diode 55, up to the voltage of second output line 26. After the period of time T1 has elapsed, transistor 45 of switch circuit 40 is turned ON and second error amplifying transistor 42 is turned OFF. At this instance, switch 20 is rendered conductive. Accordingly, the voltage on output line 21 is raised by the power supplied thereto from secondary winding 9 of transformer 6 through first rectifier-and-smoothing circuit 19. First output-voltage-detection and error-amplifier circuit 30 is activated and phototransistor 16 is controlled so that the voltage on first output line 21 is controlled to be constant.

When the voltage on first output line 21 on the high load side has been controlled to be constant, the voltage on second output line 26 on the low load side also becomes virtually constant.

Since second error amplifying transistor 42 is turned OFF when the voltage on output line 21 has risen to reach a stable value, the voltage on second output line 26 is kept from rising.

Further, smoothing capacitor 18 is charged up to the level of the voltage on second output line 26 immediately before switch 20 is turned ON. Therefore, no rush current flows into capacitor 18 when switch 20 is turned ON.

Thus, the voltage drop occurring on second output line 26 is restrained.

Further, if the voltage on second output line 26 is set at a slightly higher value while power is supplied to the sub-load, i.e., satellite tuner 27, U/V tuner 28, microprocessor 50, and remote control signal receiving circuit 29, the subload can be operated more stably even when a certain amount of voltage drop as described above occurs on second output line 26.

According to the present embodiment as described above, the voltage on output line 26 is not subject to voltage drop of a large amount even when the control of the second output line is switched to that of the first output line. Hence, the sub-load circuit run from the sub-power source can be operated more stably.

The invention is not limited to the embodiments described above. For example, these variations can be made:

(1) Circuits on the primary side of transformer 6 of the switching regulator and the voltage control circuit can be modified in various ways.

For example, transistor 8 may be replaced with an FET, and transistor 8 may be ON/OFF controlled in a separate-excitation manner by providing a pulse-width modulation (PWM) circuit, instead of allowing self-excited oscillation to be made by fourth winding 11.

(2) By disposing a control transistor in the position of phototransistor 16, the base of the control transistor may be controlled by phototransistor 16.

According to the power circuit of the present invention as described above, a stabilized power voltage can be provided thereby when power is started to be supplied to the TV circuit, of a larger load than the sub-load circuit, connected to the main power source, while the sub-load circuit in connection with the sub-power source is activated.

What is claimed is:

1. A power circuit comprising:

(a) a transformer including a primary winding, and a secondary winding and a tertiary winding magnetically coupled with the primary winding;

(b) a switching element connected between one end and the other end of a DC power circuit, through the primary winding of said transformer;

(c) a switch circuit inserted in a first circuit by being connected in series with one end of the secondary winding;

(d) a first rectifier-and-smoothing circuit connected in series with the other end of said switch circuit;

(e) a second rectifier-and-smoothing circuit connected with the tertiary winding for supplying power to a second circuit;

(f) a first output-voltage-detection and error-amplifier circuit for obtaining a signal corresponding to the difference between a detected value of a first output voltage obtained from said first rectifier-and-smoothing circuit and a first reference voltage;

(g) a second output-voltage-detection and error-amplifier circuit for obtaining a signal corresponding to the difference between a detected value of a second output voltage obtained from said second rectifier-and-smoothing circuit and a second reference voltage;

(h) a microprocessor for activating said switch circuit, and said second output-voltage-detection and error-amplifier circuit such that
 (1) said second output-voltage-detection and error-amplifier circuit is activated while power is supplied only to the second circuit,
 (2) power is supplied to the first circuit upon turning ON of said switch circuit, and
 (3) said second output-voltage-detection and error-amplifier circuit is stopped while said switch circuit is ON;

(i) a control circuit including a light-emitting element, responding to at least one of the outputs of said first output-voltage-detection and error-amplifier circuit and second output-voltage-detection and error-amplifier circuit, and a photo-receiving element optically coupled with said light-emitting element, for controlling said switching element such that the first or second output voltage is controlled to be constant in accordance with the change in the resistance value of said photo-receiving element; and (j) a circuit for raising the second output voltage obtained from said second rectifier-and-smoothing circuit by restricting current flowing into said second output-voltage-detection and error-amplifier circuit immediately before said microprocessor renders said switch circuit conductive.

2. The power circuit according to claim 1, further comprising:

(k) a voltage detection circuit for detecting the first output voltage, wherein said microprocessor further refers to the detected output voltage by said voltage detection circuit for a predetermined period of time after said switch circuit has been rendered conductive and, if the detected output voltage fails to reach a predetermined value, turns OFF the DC power source.

3. The power circuit according to claim 2, wherein said circuit for raising the second output voltage is formed of a parallel circuit of a resistor and another switch circuit, and said microprocessor keeps said another switch circuit open for a second predetermined period of time from the point of time a first predetermined period of time before said switch circuit is rendered conductive.

4. The power circuit according to claim 1, wherein said circuit for raising the second output voltage is formed of a parallel circuit of a resistor and another switch circuit, and said microprocessor keeps said another switch circuit open for a second predetermined period of time from the point of time a first predetermined period of time before said switch circuit is rendered conductive.

5. A power circuit comprising:

(a) a transformer including a primary winding, and a secondary winding and a tertiary winding magnetically coupled with the primary winding;

(b) a switching element connected between one end and the other end of a DC power circuit through the primary winding of said transformer;

(c) a switch circuit connected in series with one end of the secondary winding for supplying power to a TV circuit;

(d) a first rectifier-and-smoothing circuit connected in series with the other end of said switch circuit;

(e) a second rectifier-and-smoothing circuit connected with the tertiary winding for supplying power to a different circuit from the TV circuit;

(f) a first output-voltage-detection and error-amplifier circuit for obtaining a signal corresponding to the difference between a detected value of a first output voltage obtained from said first rectifier-and-smoothing circuit and a first reference voltage;

(g) a second output-voltage-detection and error-amplifier circuit for obtaining a signal corresponding to the difference between a detected value of a second output voltage obtained from said second rectifier-and-smoothing circuit and a second reference voltage;

(h) a microprocessor for activating said switch circuit, and said second output-voltage-detection and error-amplifier circuit such that
 (1) said second output-voltage-detection and error-amplifier circuit is activated while power is supplied only to the second circuit,
 (2) power is supplied to the first circuit upon turning ON of said switch circuit, and
 (3) said second output-voltage-detection and error-amplifier circuit is stopped while said switch circuit is ON;

(i) a control circuit including a light-emitting element, responding to at least one of the outputs of said first output-voltage-detection and error-amplifier circuit and second output-voltage-detection and error-amplifier circuit, and a photo-receiving element optically coupled with said light-emitting element, for controlling said switching element such that the first or second output voltage is controlled to be constant in accordance with the change in the resistance value of said photo-receiving element; and (j) a current supply circuit for supplying current from said second output rectifier-and-smoothing circuit to said first rectifier-and-smoothing circuit immediately before said microprocessor renders said switch circuit conductive.

6. The power circuit according to claim 5, wherein said current supply circuit is formed of a series circuit of a diode and another switch circuit, and said microprocessor keeps said another switch circuit open for a second predetermined period of time from the point of time a first predetermined period of time before said switch circuit is rendered conductive.

* * * * *